Aug. 30, 1966    E. R. BERNIER ETAL    3,269,633
AUTOMATIC SPIN SOLDERING MACHINE
Filed Nov. 4, 1964    4 Sheets-Sheet 2
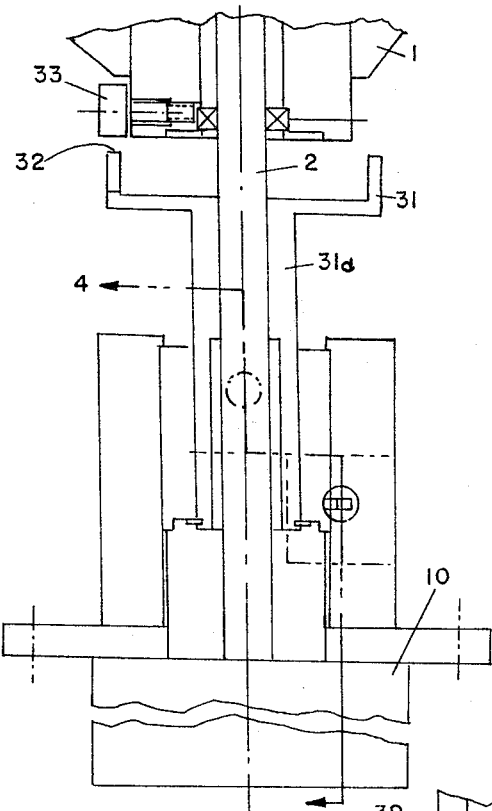
FIG. 3.
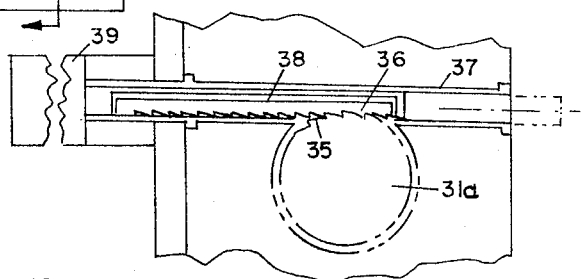
FIG. 2.
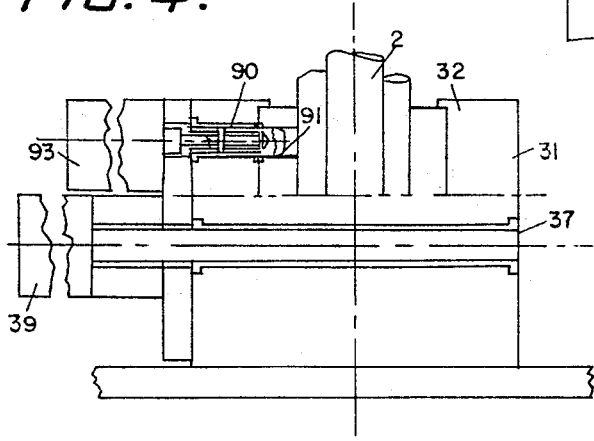
FIG. 4.
INVENTORS
PAUL F. HAYNER
EDGAR R. BERNIER
ATTORNEY

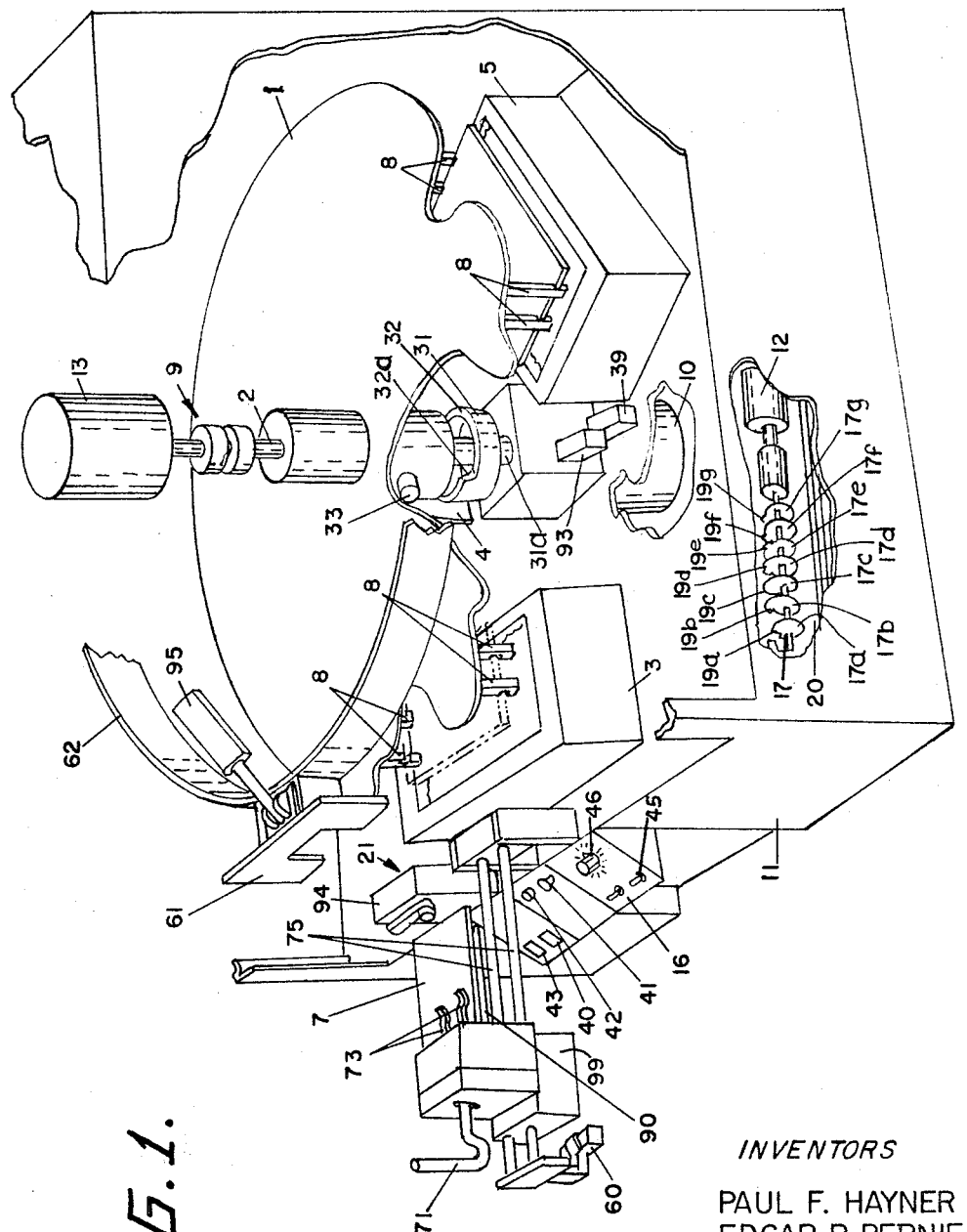

INVENTORS
PAUL F. HAYNER
EDGAR R. BERNIER

ATTORNEY

United States Patent Office 3,269,633
Patented August 30, 1966

3,269,633
AUTOMATIC SPIN SOLDERING MACHINE
Edgar R. Bernier, Nashua, N.H., and Paul F. Hayner, Lexington, Mass., assignors to Sanders Associates, Inc., Nashua, N.H., a corporation of Delaware
Filed Nov. 4, 1964, Ser. No. 408,927
20 Claims. (Cl. 228—36)

This invention relates to an automatic spin soldering machine, and more particularly, to such a machine particularly adapted to apply an even coating of solder to the conductors of a printed circuit board by spinning the board about an axis outside the board while the solder is still in a molten state, either before or after the components have been mounted on such a board, or both.

The machine according to this invention is arranged to receive an untinned, etched or unetched, drilled and eyeletted circuit board, and to apply a coating of solder to the conductors, and also to receive the same board again after it has been tinned and the components have been assembled upon it, and to solder the components into place. The machine is arranged to receive the boards to be soldered, to dip them first in flux, raise and spin them rapidly about an axis outside the board, then dip them in solder, then raise and spin them about an axis outside the board to flow off the excess solder while still liquid, so that drilling out excess solder (after cooling) from eyelets and other small holes is unnecessary; then to dip them into cleaning solution, raise and spin them about an axis outside the board and finally to return them to the loading and unloading station, where the processed boards are removed and fresh ones are inserted for processing.

Thus, in operation, the machine accepts a continuous flow of untinned boards, and delivers boards at the same rate, or accepts tinned boards with components mounted but unsoldered thereon, and delivers them at the same rate with the components soldered in position. The only attention required is that of one operator at the loading and unloading station, who removes processed boards and inserts unprocessed boards, and who may start or stop the machine at any time, or stop it from any position in case of trouble.

Provision is also made for altering the spin speed of the machine and the duration of the spinning and dipping cycles, for the automatic maintenance of the fluid level in the flux, solder, and cleaning tanks, and off-axis spinning of the boards after each dip to clear all holes of flux, solder, and cleaner; and for semi-automatic loading and unloading of the boards to be processed.

In one preferred form the machine consists of a turntable rotating about a central axis, and indexed to rotate or step through a preselected angle, for example 120°, to stop first at the unloading and loading station, which may also be the flux station, then the solder station, then the cleaning station, and finally back at the unloading and loading station again. The machine carries three boards in the process, one being inserted or removed at the unloading and loading station. Thus, in three steps of the arms about the central axis after a board is loaded, it is finished and arrives at the loading and unloading station again, and one completed board is delivered in the time required for the arms to index or make one 120° step which, for example, but not in limitation, may require 14 to 24 seconds.

Near the outer edge of the turntable, there are provided clamps in groups of three, spaced 120° apart, each group being arranged to hold a board in process. The turntable shaft is arranged to lower the boards into the respective tanks, then raise them from the tanks and rapidly spin them to remove flux, liquid solder, or cleaner, as the case may be, from the board.

Thus, a particular board is first loaded, at position of the flux tank. It is then lowered into the flux tank, where it remains for a predetermined time, is then lifted, spun for a predetermined period, and indexed 120° coming to rest over the solder tank. It is then lowered into the solder tank, lifted after a predetermined time, spun and indexed 120° again, coming to rest, after the spin has stopped, over the cleaning tank, then lowered into the cleaning tank, raised after a predetermined time, spun and indexed again another 120° to the loading and unloading station. Thus, it takes three cycles of 120° each to process a board. The processed board is then unloaded and replaced by a fresh unprocesesd board. The direction of indexing of the turntable is opposite that of its spin direction in the embodiment of the invention herein shown and described.

In one preferred form of this invention, the indexing drive is a cylinder containing a piston driven by compressed air, and the turntable is raised, lowered and spun by compressed air. The valves which control the flow of air are actuated by a series of cams on a program drum driven by a program motor, preferably a D.C. variable speed motor. The program drum may be formed of a series of cam disks arranged axially along a shaft and clamped or locked in position to form, in effect, a solid drum, but one in which individual cam disks may be removed and replaced to adjust the acceleration, velocity and duration of the spin, and also the duration of the dipping cycle. The duration of the entire cycle can be controlled by varying the speed of the D.C. motor.

In one preferred form on the invention, the machine is enclosed in a housing, provided with a loading and unloading fixture at the loading and unloading station, preferably at the flux tank index position. The fixture may be slid out of the machine carrying a circuit board to permit (1) removal of the processed circuit board and insertion of an unprocessed circuit board, and then slid back into the housing, (2) to place the unprocessed board in the clips which hold it in position during its travel through the machine. An access door is provided in the housing, with a circuit interlock so that the access door may be opened only when a board arrives at the loading and unloading station, and the fixture operated to remove the finished board and insert a fresh one, without interrupting operation of the machine. Any attempt to open the door and/or operate the fixture, at any other time, trips the interlock switch and stops the machine.

Various automatic controls are provided to maintain desired temperatures in the flux, solder, and cleaning tanks therein. Signal lights are also provided to show the operator when conditions are as desired, and when the machine is ready to operate, and a manual start button actuates the machine for each 120° cycle when the machine is ready to run, as indicated by a signal or "run" light.

Among the objects of this invention are:

To provide an automatic spin tinning machine which will deliver circuit boards tinned on both sides, if desired, free from excess solder, and especially boards in which eyelet and other holes are open, eliminating the previously necessary hand drilling to remove excess solder from such holes;

To provide such a machine which will provide an even deposit of solder, eliminating the uneven deposits heretofore encountered;

To provide such a machine in which the boards are spun eccentrically about an axis external to the boards, the amount of eccentricity being sufficient so that the "g" variation across the board is kept to a minimum, producing consistent results over the whole board area;

To provide such a machine in which the heretofore required hand fluxing and hand cleaning of boards is eliminated and replaced by machine fluxing and cleaning, thereby speeding up the production of tinned boards;

To provide such a machine in which the attention required from the operator is greatly reduced, and substantially limited to removing finished boards, and inserting into the machine boards to be tinned or soldered, and watching to see that the machine is operating normally;

To provide such a machine having an automatic cycling control, which determines the time period each board is in the various stations; i.e. the fluxing station, the soldering station, and the cleaning station;

To provide such a machine with means for spinning the board about an axis external to the board after dipping in each bath, and for automatically determining the time period and the rate of spin, chosen for optimum results for the type of board in each lot;

To provide such a machine having an electric power drive for certain operations, and a compressed air drive for other operations;

To provide such a machine with automatic controls for maintaining the desired liquid level in the flux, solder, and cleaning baths, together with signals to indicate departures from desired levels, for maintaining the desired temperature in the solder tank, and in other tanks if desired;

To provide such a machine having interlocks arranged to cause the machine to stop if the operator attempts an unsafe or undesired operation; and To provide such a machine in which the processing of boards is automatic and takes place with a continuous flow.

Still other objects and advantages of this invention will be apparent from the specification.

The features of novelty which are believed to be characteristics of this invention are set forth with particularity in the appended claims. The invention itself, however, both as to its fundamental principles and as to its particular embodiments, will best be understood by reference to the specification and accompanying drawing, in which:

FIG. 1 is a perspective view of a machine according to this invention partly broken away to show the relation of the various parts;

FIG. 2 is a section on lines 2—2 of FIG. 1, looking up;

FIG. 3 is a vertical elevation partly in section of the turntable shaft supporting and indexing mechanism;

FIG. 4 is a section on lines 4—4 of FIG. 3;

In all the drawings, common parts all bear the same reference numerals for purposes of clarity.

Figure 5:
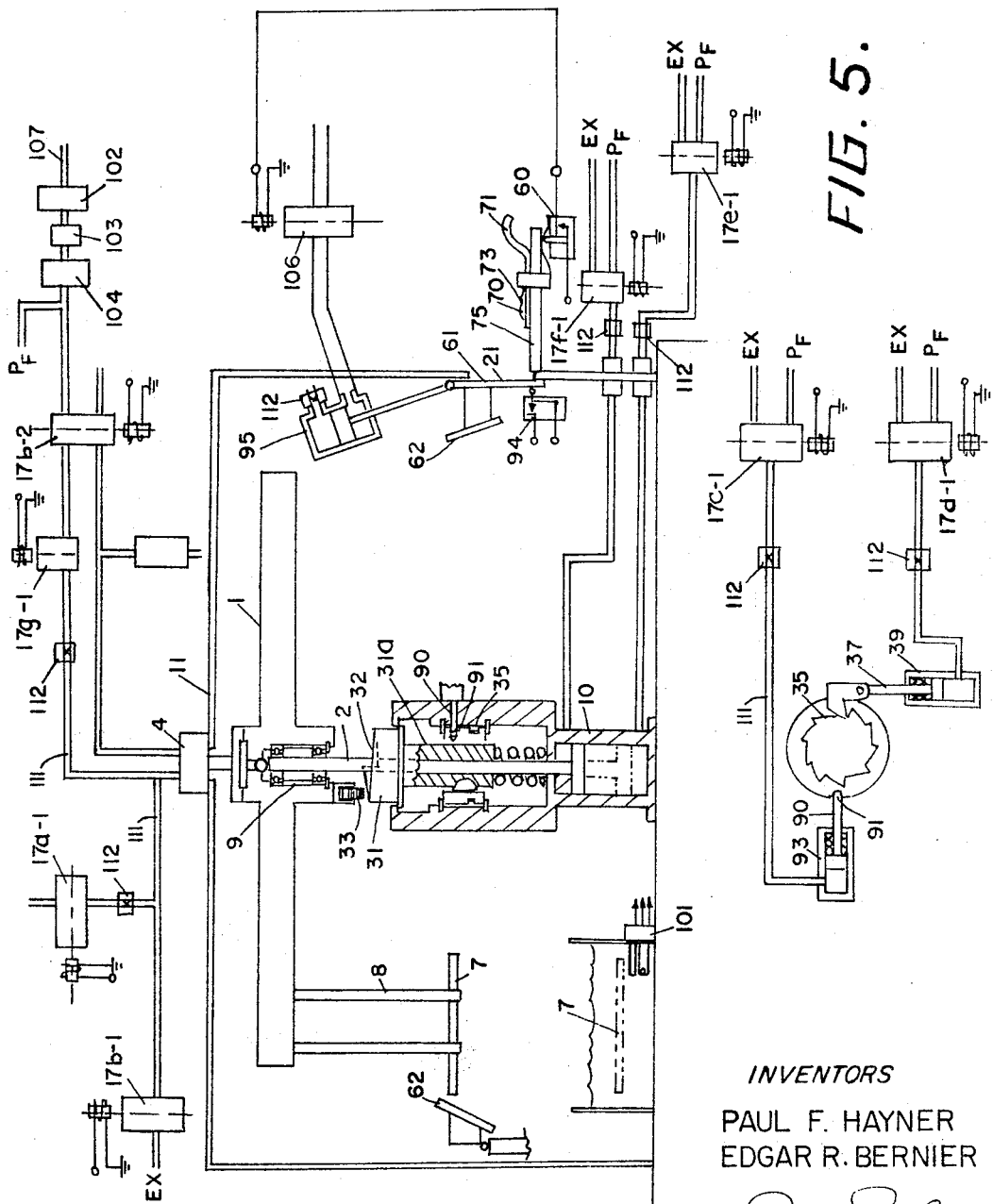
FIG. 5 is a schematic diagram of a machine according to this invention.

Referring now to FIGS. 1 and 5, the machine in the embodiment here shown and described includes a turntable 1 mounted on a shaft 2 for indexing and spinning about a vertical axis. Three tanks, which are preferably made from stainless steel, are located 120° apart and are placed under the turntable 1. The first tank 3 contains flux, the second tank 4 (only a corner of which appears behind shaft 2), melted solder, which can be covered with a surface layer of peanut oil or Shell "Peblum A," and the third tank 5, cleaner. The flux tank position also serves as the loading and unloading station, at which processed boards are unloaded, and unprocessed boards are loaded into the machine.

The board 7 is unloaded at station 21, and an unprocessed board is loaded in its place. The board is held eccentrically in clamps 8, which projects downwardly from the turntable 1 and are mounted on the lower side of said turntable, as will be described in more detail hereinafter. The turntable shaft 2 is rotated by an air motor 13 through a clutch 9, the motor being positioned at the upper extremity of shaft 2. The vertical position of the shaft is controlled by an air cylinder 10 which surrounds the shaft 2 and is operated from the compressed air source, which may be a tank supplied by a compressor located conveniently inside the housing 11 in the base area of the machine. The turntable 1 has three vertical positions, dip, load, and spin, dip being the lowest, and spin, the highest. The total vertical movement of the turntable in this instance is 3 inches, but a machine with the necessary vertical movement to handle boards of desired sizes may be made in accordance with the invention.

In the embodiment shown, the boards are spun on a turntable having a 30 inch diameter. Similarly, a machine having a turntable of any predetermined diameter to provide the necessary centrifugal force can be made in accordance with the teachings of the invention.

A control panel 16 with the desired control buttons and lights may be positioned on the exterior of the housing below the cross arm junction at the loading and unloading station 21.

Figure 6:
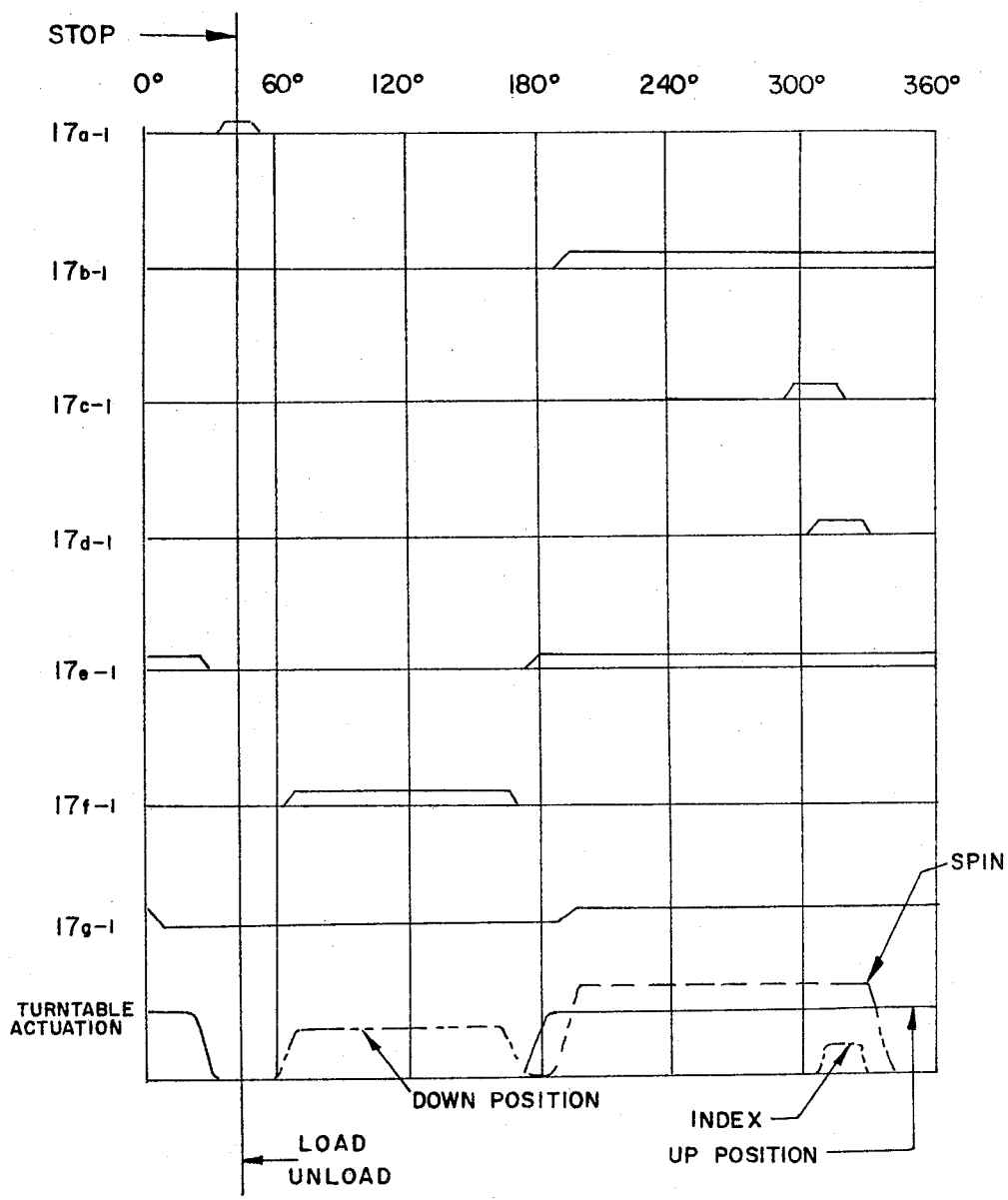
FIG. 6 is a chart showing the time relationship of the various functions.

In the embodiment of the invention shown, program motor 12 is mounted within housing 11. This motor, which is preferably a D.C. motor, has speed control and power supply means (not shown) and is operable from an A.C. source. The motor has a gear box arranged to reduce the output r.p.m. to the desired value, in order to drive the program drum 17. The program drum is made up of a series of disk cams 17a, 17b, 17c, etc. which are axially clamped together and keyed to the shaft to form a drum (shown in exploded form in FIG. 1 for clarity). Rotation of the drum causes the individual cams to actuate individual switches 19a, 19b, 19c, etc. which in turn operate electrically actuated valves, numbers 17a–1–17g–1, mounted on frame 20 to admit air at the desired times of the program cycle of FIG. 6. The air is fed to the appropriate lines shown in FIG. 5 to effect the indexing, spin, and vertical positioning of the turntable; the composite turntable actuation being shown at the bottom of FIG. 6. The valves in FIG. 5 have been numbered to correspond with the cams of FIG. 1 except that subscripts such as 1 and 2 have been added. For example, valve 17a–1 is actuated through switch 19a by the rotary motor of cam 17a. Valves 17a–1, 17b–1 and 17g–1 are two way valves. Valves 17b–2, 17c–1, 17d–1, 17e–1 and 17f–1 are three way valves. Valve 106, which operates piston 95 to open and close the loading door 61, is a two way valve. Still referring to FIG. 5 it can be seen that supply pressure is applied to line 107 and fed through a filter 102, a pressure regulator 103, and a lubricator 104. The air or fluid from the output of lubricator 104 is fed to the various valves through lines 111 and restrictors 112. For convenience in drawing, the output of line 111 has been designated with the symbol PF and wherever a valve utilizes air from this source it has been marked with the same symbol, PF. Similarly where a valve has a line that is exhausted to the atmosphere or a common return it is marked with the symbol EX. Restrictors in the various lines have all been designated with the reference numeral 112. The source of electrical power for each solenoid has not been specifically designated, but it is to be understood that it is received from the switch actuated from the appropriate cams 17a–17g.

The lower portion of shaft 2, which is carried below the turntable 1, has a cam collar 31 disposed around a part thereof. The collar has an helical cam surface 32, which is engaged by the cam roller or follower 33 on turntable 1; and the cam follower has a three-inch stroke and three vertical positions. Cam collar 31 has a downwardly projecting extension 31a, having ratchet teeth 35 on the outside thereof (FIG. 2). The ratchet teeth are engaged by a ratchet rod 36, which is axially movable in a recess in drive rod 38 in the relatively fixed carrier 37. Ratchet rod 36 is spring biased to engage ratchet teeth 35 on its power stroke, and is driven by compressed fluid actuator 39; and on each indexing stroke it rotates cam collar 31 120° counter-clockwise. At the end of the 120° rotation of cam collar 31, the same is locked in position by inward movement of cam locking rod 90 into hole 91 in the cam collar downward extension 31a, cam locking rod 90 being actuated in and out by compressed fluid cylinder 93. When the turntable 1 indexes clockwise, cam follower 33 stops turntable 1 by engaging the vertical wall 32a of cam 32 for indexing said turntable. Thus, while the turntable is spinning the cam collar is indexed 120° counterclockwise. As the rotational speed of the turntable decreases, the turntable slides downwardly on the cam collar and is stopped at the next indexing position. The vertical movement of the turntable 1 is produced by the air cylinder 10 controlled by valves 17e–1 and 17f–1 operated by the appropriate cams 17e and 17f.

A supply of flux liquid, solder pellets, and cleaning liquid is arranged to feed into the respective tanks of level controlled (float) valves (not shown) which are responsive to low levels in the respective tanks. The solder pellet admission valve is preferably driven by compressed air to its open position, against a spring return, and admission of air for actuation is controlled by a solenoid valve in the pressure line, controlled in turn by the float switch in the solder tank.

The incoming power line may be the usual 115 v. 60 cycle line, or one phase of a higher voltage 3-phase supply, stepped down to 115 v. through a transformer. Thermostatically controlled heaters as exemplified by 101 (FIG. 5) are positioned in the flux, solder and cleaner tanks respectively, are supplied by the A.C. power line. The temperature setting of each of the heaters is adjustable to permit maintaining the respective tank contents at the desired temperature. A blower ventilating fan may be operated from the power supply through a manual switch 43 (FIG. 1). The heater and blower supply lines are not opened by the cycling operations, but are closed when the machine is prepared for operation, as by the manual switch, and opened only when the machine is shut down for a protracted period.

The machine is operated from a control panel 16 upon which is mounted a master power switch 40 and a starter push button or other suitable control 41 in the power supply line which energizes the various electrical circuits in the machine, such as that of the program motor 12. The control 41 includes a hold-in relay (not shown) which keeps motor 12 energized during each cycle and prepares the machine for running. When all the circuits are prepared and the machine is ready to run, run light 42 is energized, indicating that the machine will run when starter button 41 is pushed. When energized, the program drum 17 turns one complete revolution at which time the appropriate cam disk causes the program motor circuit and all other electrical circuits except the blower, heaters, and level control switches to be opened after one 120° cycle is completed.

An emergency stop switch 45 to stop the turntable motor is provided on the control panel 16, and an adjustable spin motor rheostat 46 is also provided.

Referring again to FIGS. 1 and 5 showing the fixture for inserting and removing the circuit board and spinning it eccentrically, a series of board holder clamps 8 are mounted on the lower side of turntable 1. Each of the clamps is notched near the lower end of its inside face to receive and hold a circuit board 7.

In the arrangement shown, the boards are spun approximately 15″ off center (the turntable spin axis) so that "g" variation is kept to a minimum, producing consistent results across the whole board area. A shroud 62 is provided to catch excess solder, flux and solvent spun off. The spinning not only cleans out eyelet holes and eliminates the previously necessary step of manually drilling out filled holes, but produces an even coating over the conductors, such as would be obtained by plating.

The machine control panel 16 is preferably located at the front of the machine below the loading and unloading fixture, and carries push button machine start switch 41 in the power supply, which energizes all electrical circuits of the machine, except the ventilating blower motor switch (if provided) and the tank heater circuits, which are taken off ahead of the machine starter switch 41, as described supra.

Ahead of the machine start switch 41, in the power circuit there is provided an interlock switch 60, which controls all electrical circuits of the machine except the blower and tank heaters as mentioned supra. This switch, when the fixture is all the way in, is normally closed and is opened when the fixture is pulled out, thereby cutting off the power to program motor 12 and all electrically controlling pneumatic devices.

The machine is preferably enclosed in a housing 11 with control panel 16 in the front and below the point where circuit boards are loaded and unloaded. The loading and unloading fixture is accessible through a vertically slidable access door 61, which is mechanically connected to switch 94. When a processed board is at the loading and unloading position, the interlock is rendered ineffective, and the access door may be opened, by operation of an air operated cylinder 95 controlled by a solenoid valve 106 (lifted) without opening switch 94. At any other time (i.e., in any other position of the turntable), opening the door trips and opens switch 60, cutting off power to the program motor and stopping the machine.

The load and unload fixture (FIGS. 1 and 5) consists essentially of a tray 70, movable in and out by means of handle 71, slidable rods 75 which pass through an opening in panel housing 11 having a vertically slidable door 61, which door is actuated by a compressed fluid cylinder 95, and a plurality of spring clips or guides 73 which hold the board in position thereby enabling the same to be engaged by the clamps 8 below the turntable. Closing the drawer 99 all the way causes the innermost clamps on the spin arm to engage the board, and raising the drawer handle 71 causes the board to engage the front clamps. Lowering the handle 71 leaves the fixture disengaged from the board and causes access door 61 to close. The tray 70 is supported on a pair of horizontally spaced rods 75 carrying interlock switch 60 at their outer ends, so arranged that switch 60 is closed only when the tray 70 is fully inserted. At that time, the "Run" light 42 is lighted, showing that the machine is ready to run. Closing the "Start" switch (push button 41) will then start the program motor 12.

When the "Start" button 41 is pressed, after "Run" light 42 is on, the program motor 12 is energized and rotates to turn the program drum through one complete revolution and then stops. The cams on the drum activate the various valves 17a–1—17g–1 and 17b–2 through associated switches 17a–17g in the compressed air system to dip, lift, and rotate the turntable 1 and to index the stopping cam 31 in accordance with the program shown in FIG. 6. When the turntable is indexed 120° and stops, the machine will have brought a processed board to the unloading and loading station, assuming the machine to have been loaded with unprocessed boards. Moving the insertion fixture forward raises door 61 and allows removal of the processed board (the insertion fixture is in a raised position from the last board insertion). The fixture is merely advanced to engage the board, the handle lowered to disengage the processed board 7 from the clamps 8, the tray pulled out, and the processed board removed. Another board which is to be processed is then inserted, the drawer closed, the handle 71 raised to engage the new board by clamps 8, at which time pressing the "Start" button initiates another 120° cycle.

For example, the concept of our invention is not limited to a machine having only three stages for the tinning of circuit boards, but as many stages as necessary to carry out a desired process. Any number of stages or any process can be carried out by the provision of tanks or other processing medium, program controls, etc.

In the foregoing we have shown and described certain preferred embodiments of our invention, and the best mode presently known to us for practicing our invention, but it will be understood that modifications and changes may be made therein without departing from the spirit and scope of our invention, as will be clear to those skilled in the art.

We claim:

1. In a spin soldering machine, in combination, a frame, a turntable mounted on said frame for rotational and vertical movement, containers holding flux, solder, and cleaner respectively, positioned under said turntable, means for mounting circuit boards under said turntable, means for indexing said turntable to sequentially position said boards at each of said containers, means for raising and lowering said turntable to thereby immerse and remove said circuit boards from each of said containers, and means for spinning said turntable after immersion in each of said tanks whereby excess material is removed from said boards.

2. The combination claimed in claim 1, including a program drum provided with cams for timing movement of said turntable and the vertical position and spin speed of said turntable, and means operated by said drum for controlling the position and spin speed of said turntable.

3. The combination claimed in claim 1, including means for holding the circuit boards to be tinned, said holding means being arranged to hold with the spin axis of said boards external thereto.

4. The combination claimed in claim 3, in which said means for holding said circuit boards to be tinned are located adjacent the periphery of said turntable.

5. The combination claimed in claim 2 in which said last mentioned means comprises pneumatic valves.

6. The combination claimed in claim 1, including a program drum provided with cams for timing movement of said turntable and the vertical position and spin speed thereof, and pneumatic valves for controlling movement of and the vertical position and spin speeds of said turntable.

7. The combination claimed in claim 1 in which said raising, lowering and spinning means are driven by compressed fluid.

8. The combination claimed in claim 7, including compressed fluid driven means for indexing said turntable to thereby position said turntable successively over each container in turn.

9. In a spin tinning machine for circuit boards, a turntable assembly mounted for rotation, containers holding flux, solder, and cleaner, respectively, positioned below said turntable assembly at 120° from each other, said turntable assembly having means for eccentrically mounting boards to be tinned, compressed fluid-operated means for indexing said turntable assembly in 120° steps, and compressed fluid-operated means for raising, lowering and spinning said turntable assembly whereby excess material is removed to thereby process said printed circuit boards through said tinning machine.

10. In a spin tinning machine for circuit boards a conveyor mounted for indexing and spinning rotation and for vertical movement, containers holding flux, solder and cleaner respectively, positioned below said conveyor, means mounted on the lower side of said conveyor for eccentrically mounting boards to be tinned, means for indexing said conveyor at each of said containers, means for raising, lowering and spinning said conveyor for processing said circuit boards, and sequencing means for programming the indexing, raising, lowering and spinning of said conveyor in response to starting of said machine, whereby excess material is removed from said circuit boards by the spinning of said conveyor.

11. The combination claimed in claim 10 in which said last mentioned means comprises a program drum having a multiplicity of actuating cams, and a multiplicity of valves actuated by said cams for controlling the indexing, vertical position and spin speeds of said conveyor.

12. The combination claimed in claim 10 in which said last mentioned means comprises a program drum having a multiplicity of actuating cams, a multiplicity of electrically operated valves actuated by switches operated by said cams for controlling the indexing, vertical position and spin speed of said conveyor, said valves controlling fluid pressure responsive means for indexing and vertically positioning said conveyor and rotating the same.

13. In a soldering machine, in combination, containers holding flux, solder, and cleaner respectively, means for conveying objects to be soldered over said containers in succession and dipping said objects in said containers successively, means for spinning said objects in process while out of said containers, and means for determining the time of dip and rate of spin of said objects, said means operating in response to a starting impulse, and terminating operation after predetermined travel of said means for conveying objects, whereby the spinning of said objects removes excess material therefrom.

14. The combination claimed in claim 13 in which said means for conveying is arranged for 120° indexing rotation.

15. The combination claimed in claim 13 in which said means for conveying is arranged for 120° indexing rotation in response to a momentary starting power impulse, and for stopping indexing at the completion of the 120° indexing rotation.

16. In an automatic spin soldering machine, in combination, means for eccentrically holding circuit boards to be soldered, means for causing dipping of said boards successively in flux, solder, and cleaner, and means for spinning said holding means eccentrically after each dip to remove excess material from said board.

17. The combination claimed in claim 16, including a loading fixture for receiving boards to be processed and means for permitting horizontal sliding and vertical movement of said boards to transfer said boards to said means for eccentrically holding the same.

18. The combination claimed in claim 16, including a loading fixture for receiving boards to be processed, means for permitting horizontal sliding and vertical movement of said fixture to transfer said boards to said means for eccentrically holding the same, and means for preventing operation of said machine except when said boards are transferred to said eccentric holding means.

19. In a machine for processing objects through a process cycle, a turntable mounted for spinning rotation and for vertical movement, containers holding processing material positioned below said turntable, means on said turntable for mounting the objects to be processed, means for indexing said turntable in accordance with the number of processing steps, means for raising, lowering and spinning said turntable, and sequencing means for controlling the indexing, raising, lowering and spinning of said turntable through a process cycle, said sequencing means being operative to spin said turntable after selected ones of said processing steps to thereby remove excess material from said objects.

20. The combination claimed in claim 16, wherein said eccentric holding means is arranged to hold the circuit boards with the spin axis thereof external thereto.

References Cited by the Examiner

UNITED STATES PATENTS

| | | | |
|---|---|---|---|
| 2,387,299 | 10/1945 | Ronci | 118—54 |
| 2,447,351 | 8/1948 | Marinsky et al. | 118—54 |
| 2,776,640 | 1/1957 | Miklofsky et al. | 118—24 |
| 3,105,776 | 10/1963 | Weyhmueller | 118—52 |

JOHN F. CAMPBELL, *Primary Examiner.*

M. L. FAIGUS, *Examiner.*